United States Patent [19]

Takanashi

[11] Patent Number: 4,962,982
[45] Date of Patent: Oct. 16, 1990

[54] LIGHT BEAM SCANNING DEVICE AND LIGHT BEAM SCANNING LENS

[75] Inventor: Kenichi Takanashi, Yokohama, Japan

[73] Assignee: Ricoh Company, Ltd., Tokyo, Japan

[21] Appl. No.: 318,259

[22] Filed: Mar. 3, 1989

[30] Foreign Application Priority Data

Mar. 4, 1988 [JP] Japan .................................. 63-51159

[51] Int. Cl.$^5$ ............................................. G02B 26/08
[52] U.S. Cl. ...................................... 350/6.8; 350/6.5; 250/235
[58] Field of Search ................. 350/6.1, , 6.5, 6.6–6.9, 350/3.71, 433, 434, 320, 429; 250/235, 236

[56] References Cited

U.S. PATENT DOCUMENTS

| | | | |
|---|---|---|---|
| 4,253,735 | 3/1981 | Kawamura et al. | 350/433 |
| 4,379,612 | 4/1983 | Matsuoka et al. | 350/6.8 |
| 4,585,296 | 4/1986 | Minoura et al. | 350/6.8 |
| 4,712,884 | 12/1987 | Sakuma et al. | 350/434 |
| 4,729,617 | 3/1988 | Shimada et al. | 350/6.5 |
| 4,818,046 | 4/1989 | Kondo | 350/6.8 |
| 4,836,630 | 6/1989 | Takanashi | 350/6.8 |
| 4,846,539 | 7/1989 | Takahashi et al. | 350/6.8 |
| 4,859,011 | 8/1989 | Takahashi | 350/6.8 |

OTHER PUBLICATIONS

Laser Optical System; "Laser Optical System of the IBM 3600 Printer", Sep. 1977.
"The working of Toric Lens Surfaces" Manufacturing Optician vol. 9, No. 10, Jul. 1956 pp. 528–534.

*Primary Examiner*—Bruce Y. Arnold
*Assistant Examiner*—Thong Nguyen
*Attorney, Agent, or Firm*—Oblon, Spivak, McClelland, Maier & Neustadt

[57] ABSTRACT

Rays of light emitted from a light source are converged into a light beam by a converging optical system. The converged light beam is focused in one direction by a first focusing optical system into a linear image having a longitudinal direction corresponding to a main scanning direction in a light beam scanning device. A light deflector for deflecting the light beam has a deflecting surface disposed near a point where the linear image is focused by the first focusing optical system. The deflected light beam is focused as a light spot on a scanned surface by a light beam scanning lens serving as a second focusing optical system. The focused light spot scans a surface at a substantially constant speed. the light beam scanning lens comprises a single-element lens having a cylindrical surface facing the light deflector and a toric surface facing the surface which is scanned by the focussed light spot.

3 Claims, 8 Drawing Sheets

CURVATURE OF FIELD

CURVATURE OF FIELD (DOTTED LINE: MAIN SCANNING DIRECTION
SOLID LINE: AUXILIARY SCANNING DIRECTION)

CURVATURE OF FIELD

CURVATURE OF FIELD

CURVATURE OF FIELD

CURVATURE OF FIELD

CURVATURE OF FIELD

CURVATURE OF FIELD

CURVATURE OF FIELD

CURVATURE OF FIELD

CURVATURE OF FIELD

CURVATURE OF FIELD

CURVATURE OF FIELD

CURVATURE OF FIELD

CURVATURE OF FIELD

CURVATURE OF FIELD

CURVATURE OF
FIELD

CURVATURE OF
FIELD

CURVATURE OF
FIELD

CURVATURE OF
FIELD

CURVATURE OF FIELD

CURVATURE OF FIELD

LIGHT BEAM SCANNING DEVICE AND LIGHT BEAM SCANNING LENS

BACKGROUND OF THE INVENTION

The present invention relates to a light beam scanning device and a light beam scanning lens for use therein.

Light beam scanning devices are widely used in writing optical information and optically reading originals carrying images. There have recently been demands for light beam scanning devices which will find wider use, are less costly, and more compact than conventional light beam scanning devices. For making a light beam scanning device compact, it is effective to employ a wider-angle light beam scanning lens in the device. For manufacturing a light beam scanning device, it is effective to employ a single-element light beam scanning lens in the device.

The applicant has proposed an $f\theta$ lens as a light beam scanning lens for use with parallel rays of light (see Japanese Laid-Open Patent Publication No. 61-48684). The proposed $f\theta$ lens is a single-element lens, and has a curvature of field in the range of from 5 to 10 mm at a half field angle of about 21° with respect to f=300 mm. Since this lens is not suitable for use as an ultrawide angle lens, it poses a certain limitation on efforts to make light beam scanning devices compact.

Japanese Laid-Open Patent Publication No. 54-87540 discloses a single-element lens for use as a light beam scanning lens, the lens having a function similar to an $f\theta$ function with respect to a divergent deflected light beam applied thereto. This lens also has a curvature of field of more than 5 mm at a half field angle ranging from 15° to 17° with respect to f=150 mm. The lens is also not suitable for use as an ultrawide angle lens, and cannot make light beam scanning devices appreciably compact.

SUMMARY OF THE INVENTION

It is an object of the present invention to provide a light beam scanning device which employs an ultra-wide-angle single-element lens as a light beam scanning lens.

Another object of the present invention is to provide a light beam scanning lens for use in a light beam scanning device.

According to the present invention, there is provided a light beam scanning device comprising a light source for emitting rays of light, a converging optical system for converging the rays of light from the light source into a convergent light beam, a first focusing optical system for converging the light beam in one direction into a linear image having a longitudinal direction corresponding to a main scanning direction in the light beam scanning device, a light deflector for deflecting the light beam, the light deflector having a deflecting surface disposed near a point where the linear image is focused by the first focusing optical system, and a second focusing optical system for focusing the light beam deflected by the light deflector onto a scanned surface in the main scanning direction to scan the scanned surface with the focused light beam at a substantially constant speed, the second focusing optical system placing a point where the light beam is deflected by the light deflector and the scanned surface in substantially conjugate relationship to each other with respect to the second focusing optical system in an auxiliary scanning direction transverse to the main scanning direction in terms of geometrical optics. The second focusing optical system comprises a single-element lens having a cylindrical surface facing the light deflector and having a negative refracting power in the auxiliary scanning direction, and a toric surface facing the scanned surface and having different positive refracting powers respectively in the main and auxiliary scanning directions, the second focusing optical system having a refractive index n, a central thickness d, a maximum effective deflection angle $\theta$ in the main scanning direction, the cylindrical surface of the second focusing optical system being spaced by a distance D from the point where the light beam is deflected by the light deflector, the second focusing optical system having a front principal point which is spaced by a distance S from a point where the light beam is focused by the converging optical system in the main scanning direction, the second focusing optical system meeting the following conditions:

$$0.82 < [\{(n - 1)f - d\}/D] \cdot [\cos\theta/\sqrt{n^2 - \sin^2\theta}\,] < 1.28; \quad (I)$$

and $$1.9 < (nf)/S < 3.2. \quad (II)$$

The scanning of the surface with the light beam at a substantially constant speed means that any deviation from the constant-speed scanning can electrically be corrected.

The single-element lens which meets the above conditions and is used as described above can achieve a very wide angle as a light beam scanning lens, and makes the light beam scanning device compact and inexpensive.

Since the light beam scanning lens is capable of correcting facet-errors of the light deflector, any other correcting optical system is not required between the light deflector and the scanned surface. This also makes the light beam scanning device compact and inexpensive. Inasmuch as the light beam scanning lens may be made of a material having a low refractive index, it may be made of plastics.

The above and other objects, features and advantages of the present invention will become more apparent from the following description when taken in conjunction with the accompanying drawings in which a preferred embodiment of the present invention is shown by way of illustrative example.

DETAILED DESCRIPTION

Figure 1A:
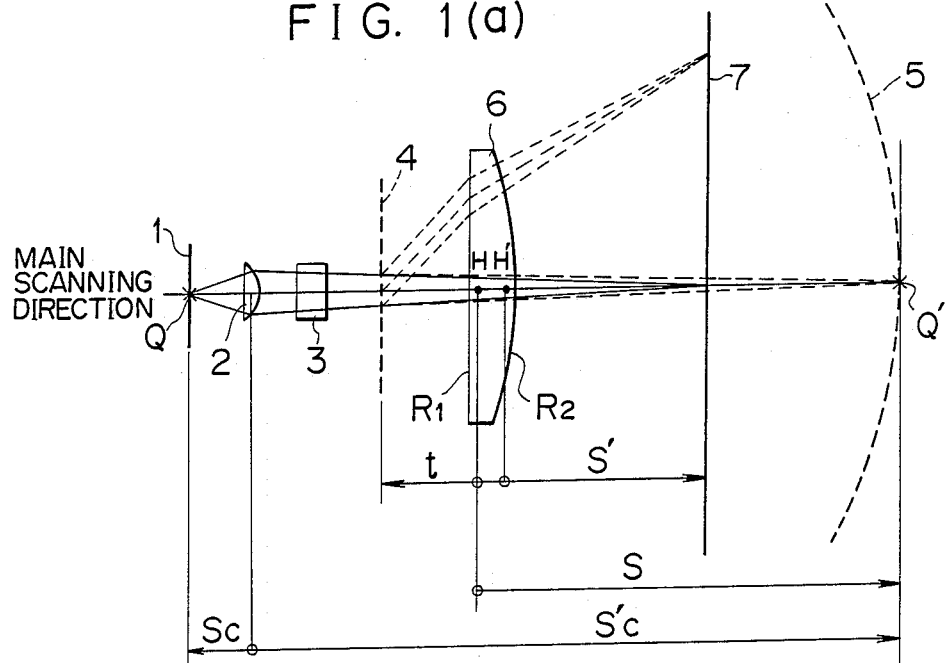
FIGS. 1(a) and 1(b) are schematic diagrams showing a optical arrangement of a light beam scanning device according to the present invention.
Figure 1B:
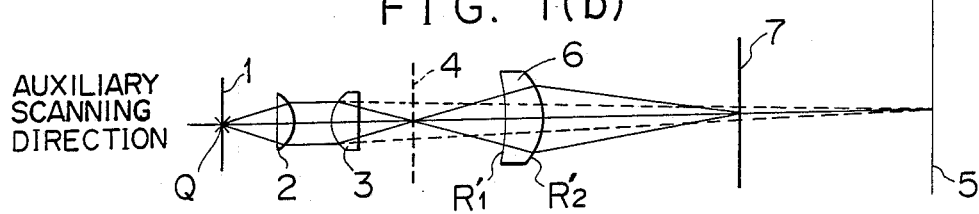

FIGS. 1(a) and 1(b) schematically show an optical arrangement of a light beam scanning device according to the present invention. The light beam scanning device includes a light source Q and a condenser lens 2 as a converging optical system. The light source Q serves to radiate scanning light rays and may comprise a semiconductor laser, a light-emitting diode, or the like. In FIGS. 1(a) and 1(b), the light source Q comprises a semiconductor laser. The light source Q is disposed on the object side of the condenser lens 2 on its optical axis for applying divergent light rays to the condenser lens 2. Designated at 1 is a plane, i.e., an object plane, disposed in the light source Q and lying perpendicularly to the optical axis.

The light rays applied to the condenser lens 2 would be focused thereby on a point Q′ (naturally focused point) on an image plane 5 if there were no optical system on the image side of the condenser lens 2.

The light beam scanning device further includes a cylindrical lens 3 as a first focusing optical system.

The reference numeral 4 represents a light deflecting or reflecting surface of a light deflector for deflecting a light beam at a constant angular velocity from the condenser lens 2. The lens 3 is disposed between the lens 2 and the deflector 4. Light beam is converged into one direction by the lens 2, and is formed as a linear image in the vicinity of the reflecting surface. The light deflector comprises a polygon mirror (FIG. 2(a) in the illustrated embodiment, but may be a pyramidal mirror, a galvanometer mirror, or the like. When the light beam converged by the condenser lens 2 is deflected by the light deflector, the focused point of the light beam from the condenser lens 2 is moved along the image plane 5 which is an arcuate plane. With the light deflector comprising a polygon mirror, since the point where the light beam is deflected by the light deflector slightly fluctuates on the optical axis during operation of the light deflector, the focused point does not follow an exactly arcuate path, but moves approximately on the arcuate image plane 5.

As shown in FIG. 1(b), the cylindrical lens 3 converges the light beam from the condenser lens 2 in an auxiliary scanning direction (which is a vertical direction in FIG. 1(b) and a direction normal to the sheet of FIG. 1(a)) to focus a linear image near the light deflecting surface 4 of the light deflector, the linear image having a longitudinal direction corresponding to a main scanning direction which is perpendicular to the auxiliary scanning direction.

The light beam scanning device further includes a light beam scanning lens 6 serving as a second focusing optical system. The light beam scanning lens 6 is disposed between the point where the light beam is deflected by the light deflector and a plane 7 which is scanned by the light beam.

The light beam scanning lens 6 converges the light beam converged by the condenser lens 2 in the main scanning direction as shown in FIG. 1(a), so that the light beam is focused on the scanned pane 7. In the auxiliary scanning direction, as shown in FIG. 1(b), the light beam scanning lens 6 places the point where the light beam is deflected by the light deflector and the scanned plane 7 in substantially conjugate relationship to each other with respect to the lens 6 in terms of geometrical optics.

The light beam scanning lens 6 has a facet-error correcting function for correcting facet error of the light deflector dependent on conditions in the auxiliary scanning direction.

With the light beam scanning device of the invention, the light beam converged by the condenser lens 2 is further converged by the light beam scanning lens 6, and the scanned plane 7 is positioned near the point where the light beam from the light beam scanning lens 6 is focused. In this manner, the curvature of field of the light beam scanning lens 6 is greatly improved. The light beam scanning device has an effective deflection angle of about 100° and hence an ultrawide angle. The light beam scanning device can remove scanning pitch irregularities in the auxiliary scanning direction which would otherwise result from facet errors of the light deflector.

In order to achieve the above function, the light beam scanning lens 6 has cylindrical surface facing the light beam deflector and having a negative refracting power in the auxiliary scanning direction, and a toric surface facing the scanned surface 7 and different positive refracting powers respectively in the main and auxiliary scanning directions.

The light source Q and the image point Q′ are an object and an image, respectively, with respect to the condenser lens 2. The object distance is indicated by Sc, whereas the image distance is indicated by S′c. The image point Q′ and the scanned surface 7 are an object and an image, respectively, with respect to the light beam scanning lens 6 with the object distance being indicated by S and the image distance by S′. Denoted at t in FIG. 1(a) is a distance from the point where the light beam is deflected by the light deflector to a front principal point H of the light beam scanning lens 6, which has a rear principal point H′.

Figure 2:
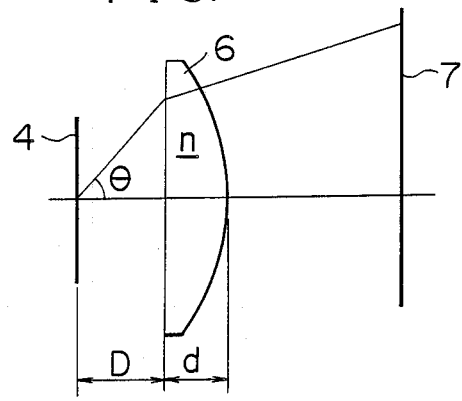
FIG. 2 is a schematic diagram illustrating a light beam scanning lens according to the present invention.
Figure 2A:
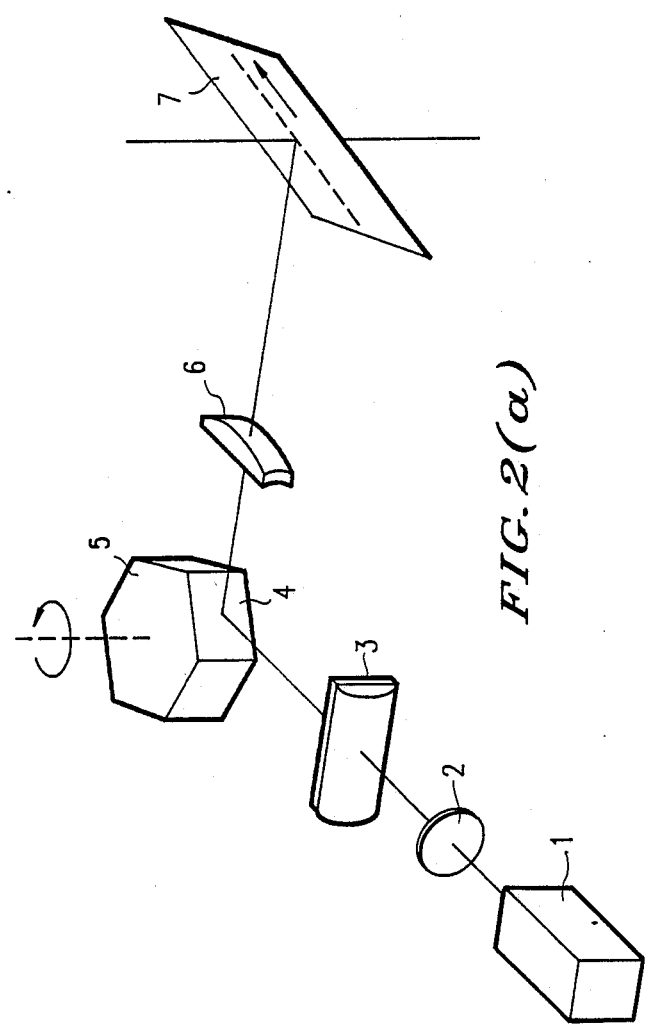
FIG. 2(a) is a schematic diagram showing an overall configuration of the optical scanning device that uses a polygonal mirror as a light deflector.

As shown in FIG. 2, the light beam scanning lens 6 has a refractive index n and a central thickness d. The cylindrical surface of the light beam scanning surface 6 is spaced by a distance D from the point where the light beam is deflected by the light deflector. The light beam scanning lens 6 has a maximum effective deflection angle $\theta$ in the main scanning direction, and a focal length f in the main scanning direction. The object distance S, i.e., the distance between the front principal point H of the light beam scanning lens 6 and the image point Q′ (naturally focused point) where the light beam converged by the condenser lens 2 is focused in the main scanning direction, and the above parameters n, d, D, $\theta$, f meet the foregoing conditions (I) and (II).

If the lower limit of the condition (I) were exceeded, the curvature of field in the main scanning direction would be large on the under side at an intermediate image height, and the extent of curvature of field in the auxiliary scanning direction would be large, resulting in difficulty in uniformizing the diameters of a scanning spot in the main and auxiliary scanning directions. If the upper limit of the condition (I) were exceeded, the curvature of field in the main scanning direction would be increased on the under side at a full image height, making it difficult to uniformize spot diameters in the main scanning direction, and the lens diameter would be too large to make the lens practical.

If the lower limit of the condition (II) were exceeded, the curvature of field in the main scanning direction would be shifted into the under side, and if the upper limit of the condition (II) were exceeded, the curvature of field in the main scanning direction would be shifted into the over side, making it difficult to uniformize spot diameters in the main scanning direction. If the upper limit of the condition (II) were exceeded, linearity would be lowered.

22 examples of the light beam scanning device will be described below. In each of the examples, the focal length of the light beam scanning lens 6 is f=200. Radii of curvature of the surfaces of the lens 6, in order from the light deflector, are represented by $R_1$ and $R_2$, respectively, in the main scanning direction, and radii of curvature of the surfaces of the lens 6, in order from the light deflector, are represented by $R'_1$ and $R'_2$, respectively, in the auxiliary scanning direction. In each of the examples, $A=[\{n-1\}f\text{-}d\}/D]\cdot[\cos\theta/\sqrt{n^2-\sin^2\theta}]$, $B=(nf)/S$. S indicates the distance from the front principal point of the light beam scanning lens 6 to the image point Q' focused by the condenser lens 2, as shown in FIG. 1(a).

In each of the examples, the position of the light beam scanning lens is determined by the distance D from the deflecting or reflecting surface of the light deflector.

The light source, the converging optical system, and the first focusing optical system are arranged such that the position where the linear image extending in the main scanning direction is focused substantially coincides with the position of the deflecting surface, and the naturally focused point focused by the converging optical system is positioned at the distance S from the front principal point of the light beam scanning lens.

In the diagram of each example which shows curvatures of field, the solid-line curve represents a curvature of field in the auxiliary scanning direction, and the broken-line curve a curvature of field in the main scanning direction.

EXAMPLE 1

| $R_1$ | $R'_1$ | $R_2$ | $R'_2$ | D | d |
|---|---|---|---|---|---|
| ∞ | −36.9 | −97.038 | −12.708 | 39 | 20 |
| n | A | B | S | | |
| 1.48519 | 0.998 | 2.29 | 129.87 | | |

Maximum deflection angle: 100°, Linearity: 9.7% or less

Figure 3:
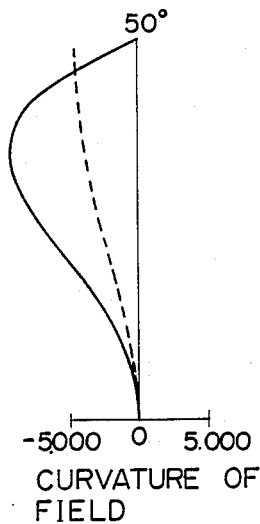
FIGS. 3 through 24 are diagrams showing curvatures of field of light beam scanning lenses according to examples of the present invention.

FIG. 3 shows curvatures of field in the main and auxiliary scanning directions of Example 1.

EXAMPLE 2

| $R_1$ | $R'_1$ | $R_2$ | $R'_2$ | D | d |
|---|---|---|---|---|---|
| ∞ | −27.6 | −97.038 | −11.4216 | 34 | 20 |
| n | A | B | S | | |
| 1.48519 | 1.145 | 2.58 | 114.94 | | |

Maximum deflection angle: 100°, Linearity: 10.5% or less

Figure 4:
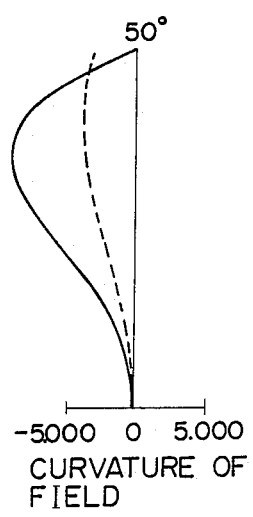

FIG. 4 shows curvatures of field in the main and auxiliary scanning directions of Example 2.

EXAMPLE 3

| $R_1$ | $R'_1$ | $R_2$ | $R'_2$ | D | d |
|---|---|---|---|---|---|
| ∞ | −34.9 | −97.038 | −12.282 | 39 | 20 |
| n | A | B | S | | |
| 1.48519 | 0.998 | 2.58 | 114.94 | | |

Maximum deflection angle: 100°, Linearity: 10.4% or less

Figure 5:
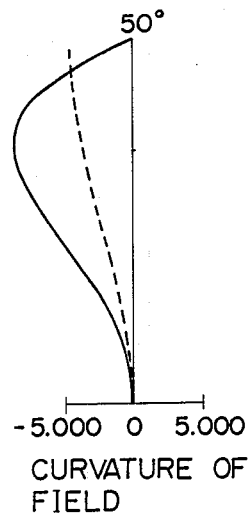

FIG. 5 shows curvatures of field in the main and auxiliary scanning directions of Examples 3.

EXAMPLE 4

| $R_1$ | $R'_1$ | $R_2$ | $R'_2$ | D | d |
|---|---|---|---|---|---|
| ∞ | −33.1 | −97.038 | −11.885 | 39 | 20 |
| n | A | B | S | | |
| 1.48519 | 0.998 | 2.88 | 103.09 | | |

Maximum deflection angle: 100°, Linearity: 11.0% or less

Figure 6:
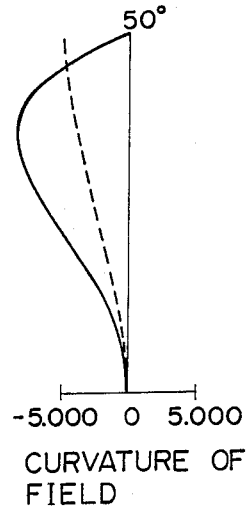

FIG. 6 shows curvatures of field in the main and auxiliary scanning directions of Example 4.

EXAMPLE 5

| $R_1$ | $R'_1$ | $R_2$ | $R'_2$ | D | d |
|---|---|---|---|---|---|
| ∞ | −36.8 | −97.038 | −13.249 | 38 | 22 |
| n | A | B | S | | |
| 1.48519 | 0.998 | 1.99 | 149.25 | | |

Maximum deflection angle: 100°, Linearity: 8.8% or less

Figure 7:
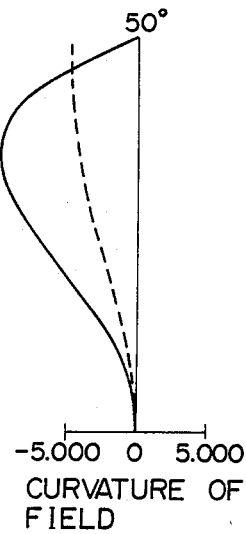

FIG. 7 shows curvatures of field in the main and auxiliary scanning directions of Example 5.

EXAMPLE 6

| $R_1$ | $R'_1$ | $R_2$ | $R'_2$ | D | d |
|---|---|---|---|---|---|
| ∞ | −34.7 | −97.038 | −12.791 | 38 | 22 |
| n | A | B | S | | |
| 1.48519 | 1.002 | 2.29 | 129.87 | | |

Maximum deflection angle: 100°, Linearity: 9.5% or less

Figure 8:
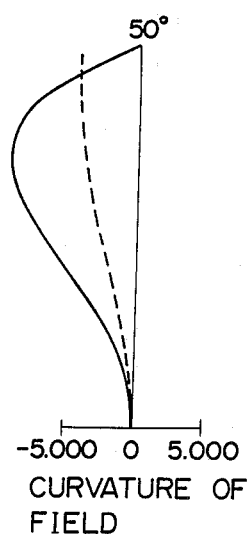

FIG. 8 shows curvatures of field in the main and auxiliary scanning directions of Example 6.

EXAMPLE 7

| $R_1$ | $R'_1$ | $R_2$ | $R'_2$ | D | d |
|---|---|---|---|---|---|
| ∞ | −32.8 | −97.038 | −12.364 | 38 | 22 |
| n | A | B | S | | |
| 1.48519 | 0.998 | 2.58 | 114.94 | | |

Maximum deflection angle: 100°, Linearity: 10.1% or less

Figure 9:
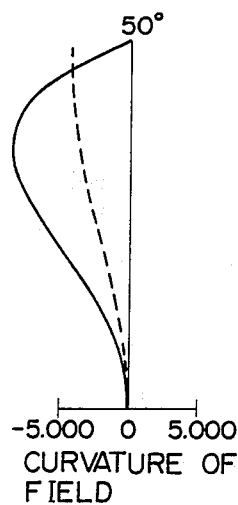

FIG. 9 shows curvatures of field in the main and auxiliary scanning directions of Example 7.

EXAMPLE 8

| $R_1$ | $R'_1$ | $R_2$ | $R'_2$ | D | d |
|---|---|---|---|---|---|
| ∞ | −31.0 | −97.038 | −11.96 | 38 | 22 |
| n | A | B | S | | |
| 1.48519 | 0.998 | 2.88 | 103.09 | | |

Maximum deflection angle: 100°, Linearity: 10.7% or less

Figure 10:
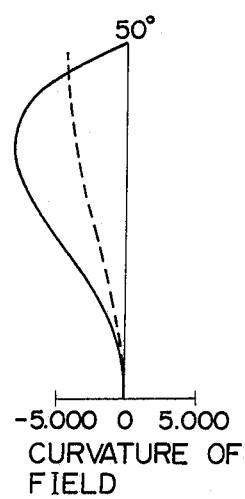

FIG. 10 shows curvatures of field in the main and auxiliary scanning directions of Example 8.

EXAMPLE 9

| $R_1$ | $R'_1$ | $R_2$ | $R'_2$ | D | d |
|---|---|---|---|---|---|
| ∞ | −34.7 | −97.038 | −13.342 | 37 | 24 |
| n | A | B | S | | |

-continued

| | | | |
|---|---|---|---|
| 1.48519 | 0.997 | 1.99 | 149.25 |

Maximum deflection angle: 100°, Linearity: 8.7% or less

Figure 11:
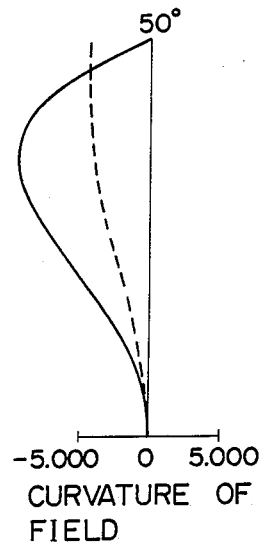

FIG. 11 shows curvatures of field in the main and auxiliary scanning directions of Example 9.

EXAMPLE 10

| $R_1$ | $R'_1$ | $R_2$ | $R'_2$ | D | d |
|---|---|---|---|---|---|
| ∞ | −32.6 | −97.038 | −12.874 | 37 | 24 |

| n | A | B | S |
|---|---|---|---|
| 1.48519 | 0.997 | 2.29 | 129.87 |

Maximum deflection angle: 100°, Linearity: 9.3% or less

Figure 12:
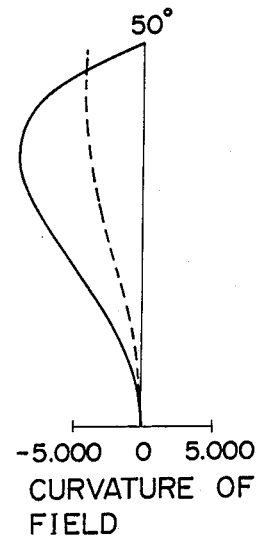

FIG. 12 shows curvatures of field in the main and auxiliary scanning directions of Example 10.

EXAMPLE 11

| $R_1$ | $R'_1$ | $R'_2$ | $R'_2$ | D | d |
|---|---|---|---|---|---|
| ∞ | −30.7 | −97.038 | −12.437 | 37 | 24 |

| n | A | B | S |
|---|---|---|---|
| 1.48519 | 0.997 | 2.58 | 114.94 |

Maximum deflection angle: 100°, Linearity: 9.9% or less

Figure 13:
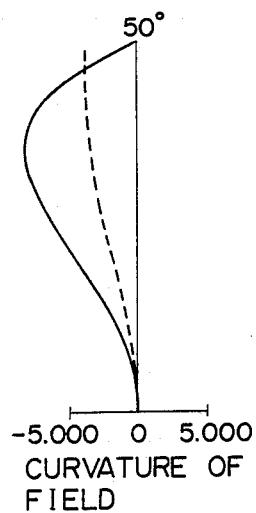

FIG. 13 shows curvatures of field in the main and auxiliary scanning directions of Example 11.

EXAMPLE 12

| $R_1$ | $R'_1$ | $R_2$ | $R'_2$ | D | d |
|---|---|---|---|---|---|
| ∞ | −28.9 | −97.038 | −12.024 | 37 | 24 |

| n | A | B | S |
|---|---|---|---|
| 1.48519 | 0.997 | 2.88 | 103.09 |

Maximum deflection angle: 100°, Linearity: 10.5% or less

Figure 14:
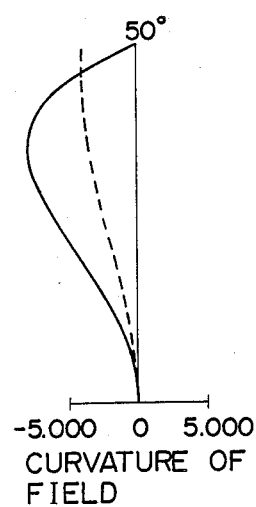

FIG. 14 shows curvatures of field in the main and auxiliary scanning directions of Example 12.

EXAMPLE 13

| $R_1$ | $R'_1$ | $R_2$ | $R'_2$ | D | d |
|---|---|---|---|---|---|
| ∞ | −26.7 | −97.038 | −12.587 | 35 | 28 |

| n | A | B | S |
|---|---|---|---|
| 1.48519 | 0.996 | 2.58 | 114.97 |

Maximum deflection angle: 100°, Linearity: 8.6% or less

Figure 15:
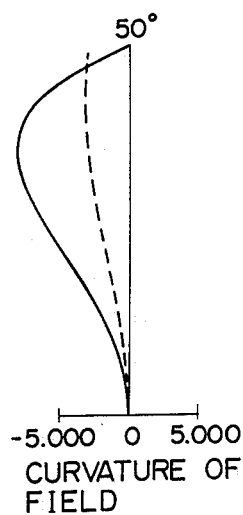

FIG. 15 shows curvatures of field in the main and auxiliary scanning directions of Example 13.

EXAMPLE 14

| $R_1$ | $R'_1$ | $R_2$ | $R'_2$ | D | d |
|---|---|---|---|---|---|
| ∞ | −22.7 | −97.038 | −12.717 | 33 | 32 |

| n | A | B | S |
|---|---|---|---|
| 1.48519 | 0.996 | 2.58 | 114.97 |

Maximum deflection angle: 100°, Linearity: 8.6% or less

Figure 16:
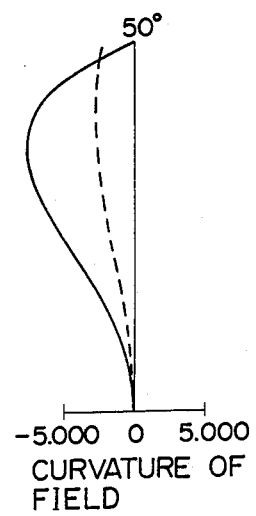

FIG. 16 shows curvatures of field in the main and auxiliary scanning directions of Example 14.

EXAMPLE 15

| $R_1$ | $R'_1$ | $R_2$ | $R'_2$ | D | d |
|---|---|---|---|---|---|
| ∞ | −18.9 | −97.038 | −12.837 | 31 | 36 |

| n | A | B | S |
|---|---|---|---|
| 1.48519 | 0.995 | 2.58 | 114.94 |

Maximum deflection angle: 100°, Linearity: 8.6% or less

Figure 17:
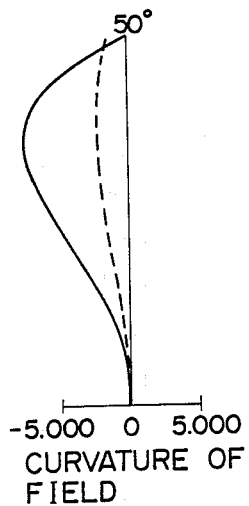

FIG. 17 shows curvatures of field in the main and auxiliary scanning directions of Example 15.

EXAMPLE 16

| $R_1$ | $R'_1$ | $R_2$ | $R'_2$ | D | d |
|---|---|---|---|---|---|
| ∞ | −58.9 | −160 | −22.743 | 55 | 20 |

| n | A | B | S |
|---|---|---|---|
| 1.8 | 1.004 | 2.41 | 149.25 |

Maximum deflection angle: 100°, Linearity: 7.1% or less

Figure 18:
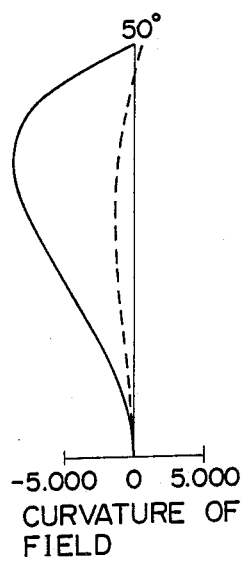

FIG. 18 shows curvatures of field in the main and auxiliary scanning directions of Example 16.

EXAMPLE 17

| $R_1$ | $R'_1$ | $R_2$ | $R'_2$ | D | d |
|---|---|---|---|---|---|
| ∞ | −56.0 | −160 | −21.882 | 55 | 20 |

| n | A | B | S |
|---|---|---|---|
| 1.8 | 1.004 | 2.77 | 129.87 |

Maximum deflection angle: 100°, Linearity: 8.1% or less

Figure 19:
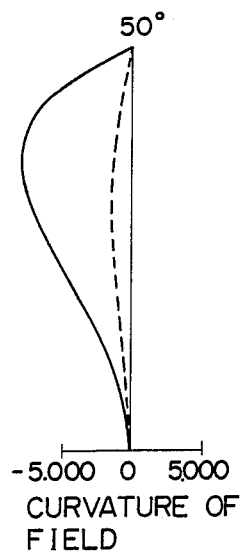

FIG. 19 shows curvatures of field in the main and auxiliary scanning directions of Example 17.

EXAMPLE 18

| $R_1$ | $R'_1$ | $R_2$ | $R'_2$ | D | d |
|---|---|---|---|---|---|
| ∞ | −53.2 | −160 | −21.073 | 55 | 20 |

| n | A | B | S |
|---|---|---|---|
| 1.8 | 1.004 | 3.13 | 114.94 |

Maximum deflection angle: 100°, Linearity: 9% or less

Figure 20:
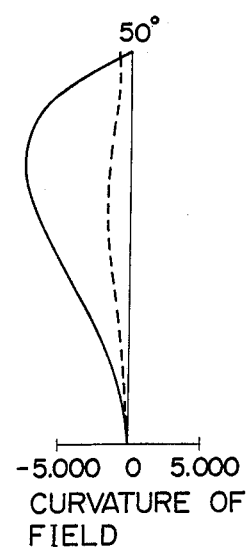

FIG. 20 shows curvatures of field in the main and auxiliary scanning directions of Example 18.

EXAMPLE 19

| $R_1$ | $R'_1$ | $R_2$ | $R'_2$ | D | d |
|---|---|---|---|---|---|
| ∞ | −55.8 | −160 | −23.157 | 54 | 24 |

| n | A | B | S |
|---|---|---|---|
| 1.8 | 0.994 | 2.41 | 149.25 |

Maximum deflection angle: 100°, Linearity: 6.8% or less

Figure 21:
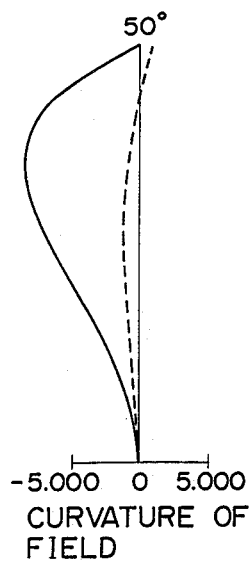

FIG. 21 shows curvatures of field in the main and auxiliary scanning directions of Example 19.

EXAMPLE 20

| $R_1$ | $R'_1$ | $R_2$ | $R'_2$ | D | d |
|---|---|---|---|---|---|
| ∞ | −51.2 | −160 | −23.323 | 52 | 28 |

| n | A | B | S |
|---|---|---|---|

-continued

| 1.8 | 1.002 | 2.41 | 149.25 |

Maximum deflection angle: 100°, Linearity: 6.5% or less

Figure 22:
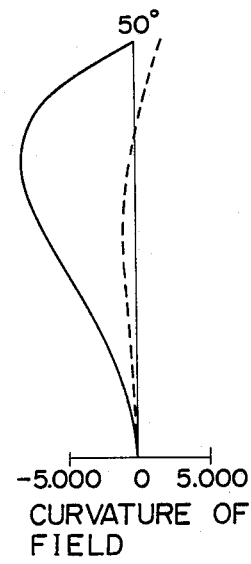

FIG. 22 shows curvatures of field in the main and auxiliary scanning directions of Examples 20.

EXAMPLE 21

| $R_1$ | $R'_1$ | $R_2$ | $R'_2$ | D | d |
|---|---|---|---|---|---|
| ∞ | −34 | −160 | −20.432 | 41 | 28 |

| n | A | B | S |
|---|---|---|---|
| 1.8 | 1.27 | 2.41 | 149.25 |

Maximum deflection angle: 100°, Linearity: 6.4% or less

Figure 23:
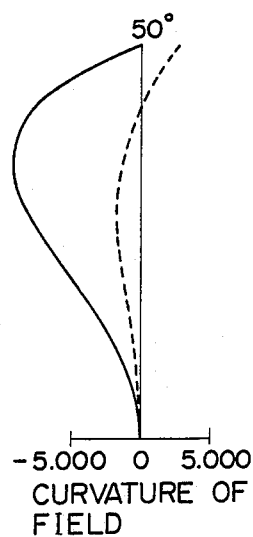

FIG. 23 shows curvatures of field in the main and auxiliary scanning directions of Example 21.

EXAMPLE 22

| $R_1$ | $R'_1$ | $R_2$ | $R'_2$ | D | d |
|---|---|---|---|---|---|
| ∞ | −65.6 | −160 | −25.61 | 63 | 28 |

| n | A | B | S |
|---|---|---|---|
| 1.8 | 0.827 | 2.41 | 149.25 |

Maximum deflection angle: 100°, Linearity: 6.3% or less

Figure 24:
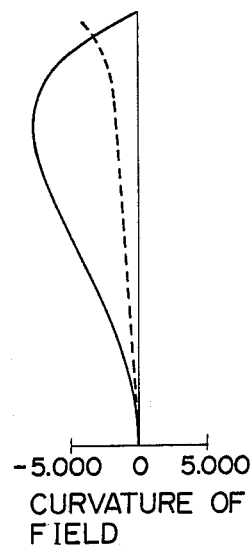

FIG. 24 shows curvatures of field in the main and auxiliary scanning directions of Example 22.

In all the 22 examples above, the linearity is about 11% at maximum, and can be electrically be corrected.

Although a certain preferred embodiment has been shown and described, it should be understood that many changes and modifications may be made therein without departing from the scope of the appended claims.

What is claimed is:

1. A light beam scanning device comprising:
a light source for emitting rays of light;
a converging optical system for converging the rays of light from said light source into a convergent light beam;
a first focusing optical system for converging said convergent light beam in one direction into a linear image having a longitudinal direction corresponding to a main scanning direction in the light beam scanning device;
a light deflector for deflecting the light beam, said light deflector having a deflecting surface disposed near a point where said linear image is focused by said first focusing optical system, wherein said convergent light beam deflected by said light deflector is deflected at a constant angular velocity;
a second focusing optical system for focusing the light beam deflected by said light deflector onto a scanned surface in the main scanning direction to scan said scanned surface with the focused light beam at a substantially constant speed, said second focusing optical system placing a point where the light beam is deflected by said light deflector and said scanned surface in substantially conjugate relationship to each other with respect to the second focusing optical system in an auxiliary scanning direction transverse to said main scanning direction in terms of geometrical optics; and
said second focusing optical system comprising a single-element lens having a cylindrical surface facing said light deflector and having a negative refracting power in said auxiliary scanning direction, and a toric surface facing said scanned surface and having different positive refracting powers respectively in said main and auxiliary scanning directions, said second focusing optical system having a refractive index n, a central thickness d, a maximum effective deflection angle $\theta$ in said main scanning direction, and a focal length f in the main scanning direction, said cylindrical surface of the second focusing optical system being spaced by a distance D from the point where the light beam is deflected by said light deflector, said second focusing optical system having a front principal point which is spaced by a distance S from a point where the light beam is focused by said converging optical system in the main scanning direction, said second focusing optical system meeting the following conditions:

$$0.82 < [\{(n-1)f - d\}/D] \cdot [\cos\theta / \sqrt{n^2 - \sin^2\theta}] < 1.28; \quad (I)$$

and $$1.9 < (nf)/S < 3.2. \quad (II)$$

2. A light beam scanning device according to claim 1, wherein said light deflector comprises a polygon mirror.

3. A light beam scanning lens in a light beam scanning device having a light source for emitting rays of light, a converging optical system for converging the rays of light from said light source into a convergent light beam, a first focusing optical system for converging said convergent light beam in one direction into a linear image having a longitudinal direction corresponding to a main scanning direction in the light beam scanning device, a light deflector for deflecting the light beam, said light deflector having a deflecting surface disposed near a point where said linear image is focused by said first focusing optical system, wherein said convergent light beam deflected by said light deflector is deflected at a constant angular velocity, and a second focusing optical system for focusing the light beam deflected by said light deflector as a light spot onto a scanned surface to scan said scanned surface with the focused light spot, said light beam scanning lens comprising a single-element lens serving as said second focusing optical system, said light beam scanning lens focusing the deflected light beam onto said scanned surface in the main scanning direction to scan said scanned surface at a substantially constant speed, and placing a point where the light beam is deflected by said light deflector and said scanned surface in substantially conjugate relationship to each other with respect to the light beam scanning lens in an auxiliary scanning direction transverse to said main scanning direction in terms of geometrical optics, said light beam scanning lens having cylindrical surface facing said light deflector and having a negative refracting power in said auxiliary scanning direction, and a toric surface facing said scanned surface and having different positive refracting powers respectively in said main and auxiliary scanning directions, said light beam scanning lens having a refractive index n, a central thickness d, a maximum effective deflection angle $\theta$ in said main scanning direction, and a focal length f in the main scanning direction, said cylindrical surface of the light beam scanning lens being spaced by a distance D from the point where the light beam is deflected by said light deflector, said light beam scanning lens having a front principal point which is spaced by a distance S from a point where the light beam is focused by said converging optical system in the main scanning direction, said light beam scanning lens meeting the following conditions:

$$0.82 < [\{(n-1)f - d\}/D] \cdot [\cos\theta / \sqrt{n^2 - \sin^2\theta}] < 1.28; \quad (I)$$

and $$1.9 < (nf)/S < 3.2. \quad (II)$$

* * * * *